Figure 1:
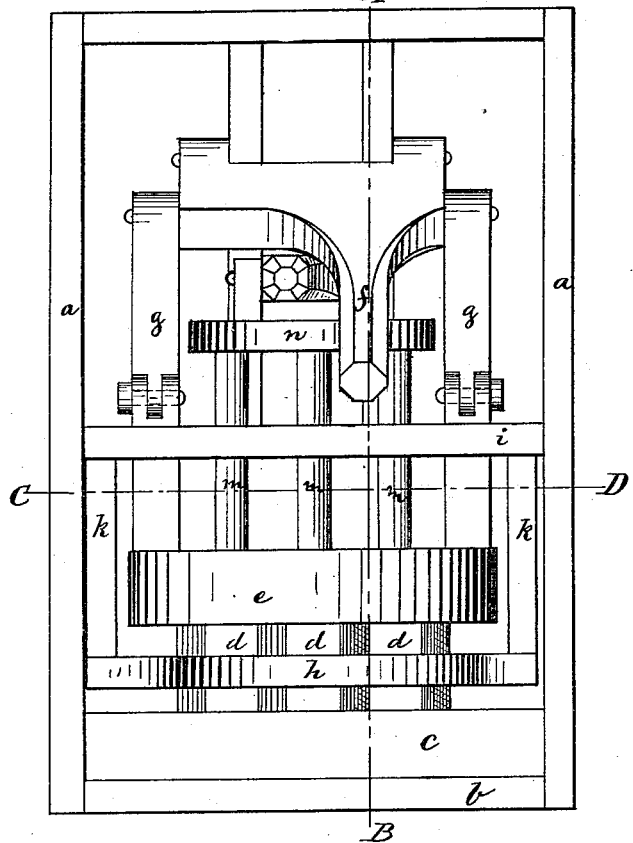

2 Sheets--Sheet 1.

P. SHAW.
Butter-Mold.

No. 167,476. Patented Sept. 7, 1875

WITNESSES:
John R. Heard
F. Allen

INVENTOR:
P. Shaw.
by Alban Andrén
his atty

2 Sheets--Sheet 2.

P. SHAW.
Butter-Mold.

No. 167,476. Patented Sept. 7, 1875.

WITNESSES:
John R. Heard
H. Allen

INVENTOR:
P. Shaw.
by Alban Andren
his atts

UNITED STATES PATENT OFFICE.

PHILANDER SHAW, OF SCITUATE, MASSACHUSETTS.

IMPROVEMENT IN BUTTER-MOLDS.

Specification forming part of Letters Patent No. 167,476, dated September 7, 1875; application filed April 19, 1875.

*To all whom it may concern:*

Be it known that I, PHILANDER SHAW, of Scituate, in the county of Plymouth and State of Massachusetts, have invented certain new and useful Improvements in Machines for Molding and Stamping Butter; and I do hereby declare the following to be a full, clear, and exact description of the invention, such as will enable others skilled in the art to which it pertains to make and use it, reference being had to the accompanying drawings, which form part of this specification.

My invention relates to improvements in apparatus for molding and stamping butter; and consists in the employment of a reciprocating frame carring the molds. Another reciprocating frame-work carries the stampers that are movable inside of the molds, and independent of the latter. Each stamper is made in two parts, viz: a central one, by means of which the butter is stamped, and an annular one, operated by the action of springs or by a positive mechanism, by which the butter is removed from the central part of the stamper during the raising of the latter from the butter.

The aforesaid reciprocating frames may be operated by levers, cranks, &c., or equivalent devices, and by hand, foot, or machine power without departing from the spirit of my invention.

The butter that is to be molded and stamped is contained in a portable shallow plate or receptacle beneath the reciprocating molds and stampers.

By means of this, my invention, I am able to mold and stamp butter so accurately that each piece shall contain an exact quantity in weight without the necessity of weighing the butter after it is taken from the molding and stamping machine. The form of each mold shown in the drawing is hexagonal, but I may make it triangular, square, or other form or configuration, so as to leave no fragment of butter between each form. The border-line between each mold may be made straight, curved, or corrugated, as may be desirable.

Figure 2:
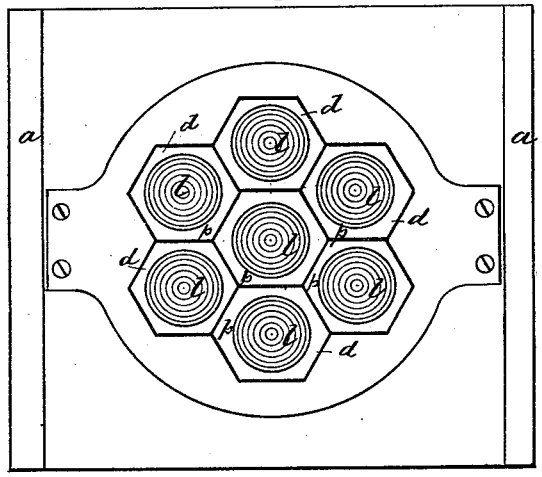
Figure 3:
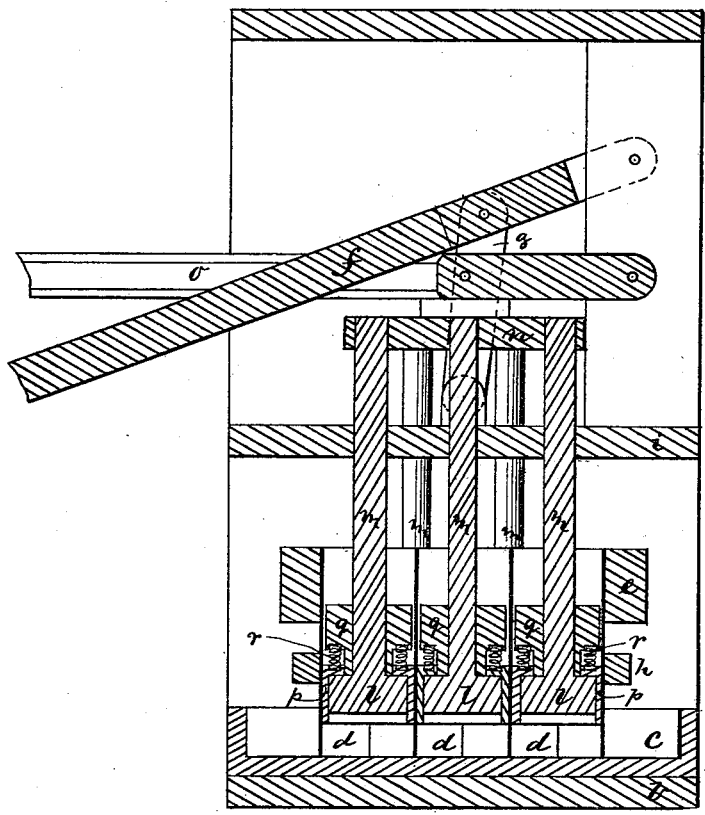
Figure 4:
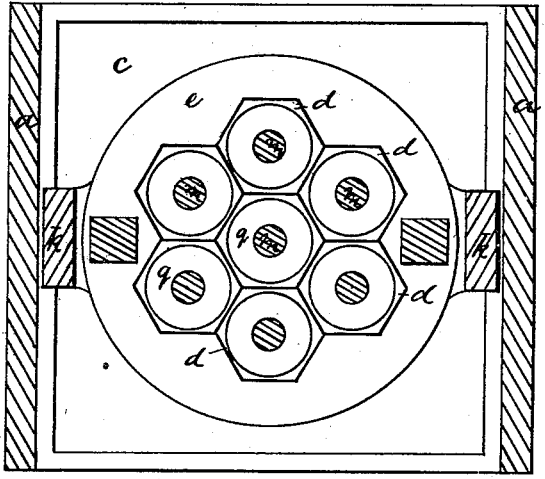

On the accompanying drawing, Figure 1 represents a front elevation of my invention. Fig. 2 represents a bottom view of the molds and stampers. Fig. 3 represents a longitudinal section on the line A B, (shown in Fig. 1;) and Fig. 4 represents a cross-section on the line C D, (also shown in Fig. 1.)

Similar letters refer to similar parts wherever they occur on the drawings.

$a\ a$ represent a suitable frame-work, of which $b$ is the bottom. $c$ is a portable plate or receptacle for the butter. $d\ d\ d$ represent the molds of such a form and shape, and so grouped together that no fragments of butter shall be left between two successive molds. The said molds $d\ d\ d$ are secured in their upper ends to a reciprocating head, $e$, as shown, to which is imparted a reciprocating motion, by means of the lever $f$, and connecting-links $g\ g$, or equivalent means. The molds $d\ d\ d$ are guided, and play through a stationary perforated plate, $h$, that is secured to an upper plate, $i$, by means of suitable braces $k\ k$. The plate $i$ is attached in a suitable manner to the uprights $a\ a$, and is made detachable therefrom, so that the molds and stampers can be easily cleaned when required. Inside of each mold $d\ d$ is a reciprocating stamper, $l\ l$, located as shown in Fig. 3. Each stamper is attached to or made in one piece, with a rod, $m\ m$, which rods are guided in the plate $i$, and secured to a head, $n$, to which a reciprocating motion is given by means of a lever, $o$, or similar means. An annular ring or piece, $p$, surrounds each of the stampers $l\ l\ l$, the outer surface of which piece fits closely to the inner surface of each mold, but not so closely as to prevent its sliding easily inside the mold. A collar or projection, $q$, is secured to each rod $m$, as shown, between which and the upper flanged part of the annular piece $p$ springs $r\ r$ are arranged, for the purpose of automatically forcing the lower part of the annular piece $p$ against the upper part of the butter, when the stamper $l$ is withdrawn from the butter, and thereby preventing the butter from adhering to the stampers. Instead of the springs $r\ r$, I may, to equal advantage, impart a positive motion, by levers or otherwise, to the annular pieces $p\ p$. The location of the stamper $l$ and the remover $p$, in respect to each other, may be reversed—that is, the remover may be placed in the center of the stamper without departing from the spirit of my invention. The under side of the stampers and the removers may be engraved with suitable ornamentions, or left plain, as may be desired.

The apparatus is operated as follows: The butter being placed in the plate or receiver $c$, as a sheet of the desired thickness, I force the molds $d\ d\ d$ to the bottom of the receiver $c$, by which the butter is cut up in a number of molds or pieces, after which the stampers $l\ l$, with their rings $p\ p$, are forced against the upper part of the butter contained in each mold. The molds $d\ d\ d$ are then removed, and the stampers $l\ l$ afterward withdrawn from the butter that is forced away from the stampers by the action of the rings $p\ p\ p$, leaving the butter properly molded, cut, and stamped in the receptacle C.

What I wish to secure by Letters Patent, and claim, is—

1. A butter-stamper, made in two movable parts, $l\ p$, one of which shall serve for the removal of the butter from the other, substantially as shown and described.

2. One or more movable molds, $d\ d\ d$, in combination with one or more movable stampers, $l\ l\ l$, as and for the purpose set forth.

In testimony that I claim the foregoing as my invention I have hereunto set my hand this 15th day of April, 1875.

PHILANDER SHAW.

Witnesses:
ALBAN ANDRÉN,
JOHN R. HEARD.